United States Patent [19]

Hautau

[11] 4,090,281

[45] May 23, 1978

[54] MACHINE TOOL WITH MULTIPLE TOOL TURRET

[75] Inventor: Charles F. Hautau, Oxford, Ohio

[73] Assignee: Ameco Corporation, Menomonee Falls, Wis.

[21] Appl. No.: 743,262

[22] Filed: Nov. 19, 1976

[51] Int. Cl.² .................... B23B 9/00; B23B 39/20
[52] U.S. Cl. ................................. 29/40; 408/35
[58] Field of Search .................. 29/39, 40, 41, 42, 43, 29/44, 45, 46, 47, 48.5, 49, 35.5, 26 A; 408/35

[56] References Cited

U.S. PATENT DOCUMENTS

| | | | |
|---|---|---|---|
| 2,630,026 | 3/1947 | Monson | 408/35 X |
| 3,473,419 | 10/1969 | Ollearo | 408/35 |
| 3,830,584 | 8/1974 | Ohlig et al. | 408/35 |
| 3,979,819 | 9/1976 | Nomura et al. | 408/35 X |

*Primary Examiner*—Gil Weidenfeld
*Attorney, Agent, or Firm*—Wheeler, Morsell, House & Fuller

[57] ABSTRACT

A machine tool includes a turret having a plurality of machine tool spindles for carrying individual cutting tools. The turret rotates in a horizontal plane about a vertical column and is supported on the column by a yoke having yoke arms projecting through slots in the column. A ball nut assembly mounted on the yoke and rotated by a motor driven screw provides vertical height adjustment of the turret and the tool spindles. The turret is selectively indexable about the vertical axis of the column to position the appropriate tool spindle in a machining position. A spindle drive motor carried by the yoke and located within the column is moved in the direction of tool feed to engage a coupling on the selected indexed tool spindle and rotate the tool carried by the spindle. Spindles can be employed with their own feed and drive independent of the turret feed and drive. The column and turret are supported on a saddle which is movable on horizontally extending ways by a lead screw for cutting feed. The work piece is carried on a cross slide for movement along a horizontal axis at right angles to the direction of tool and turret feed. The work piece is also rotatable about a vertical axis.

13 Claims, 6 Drawing Figures

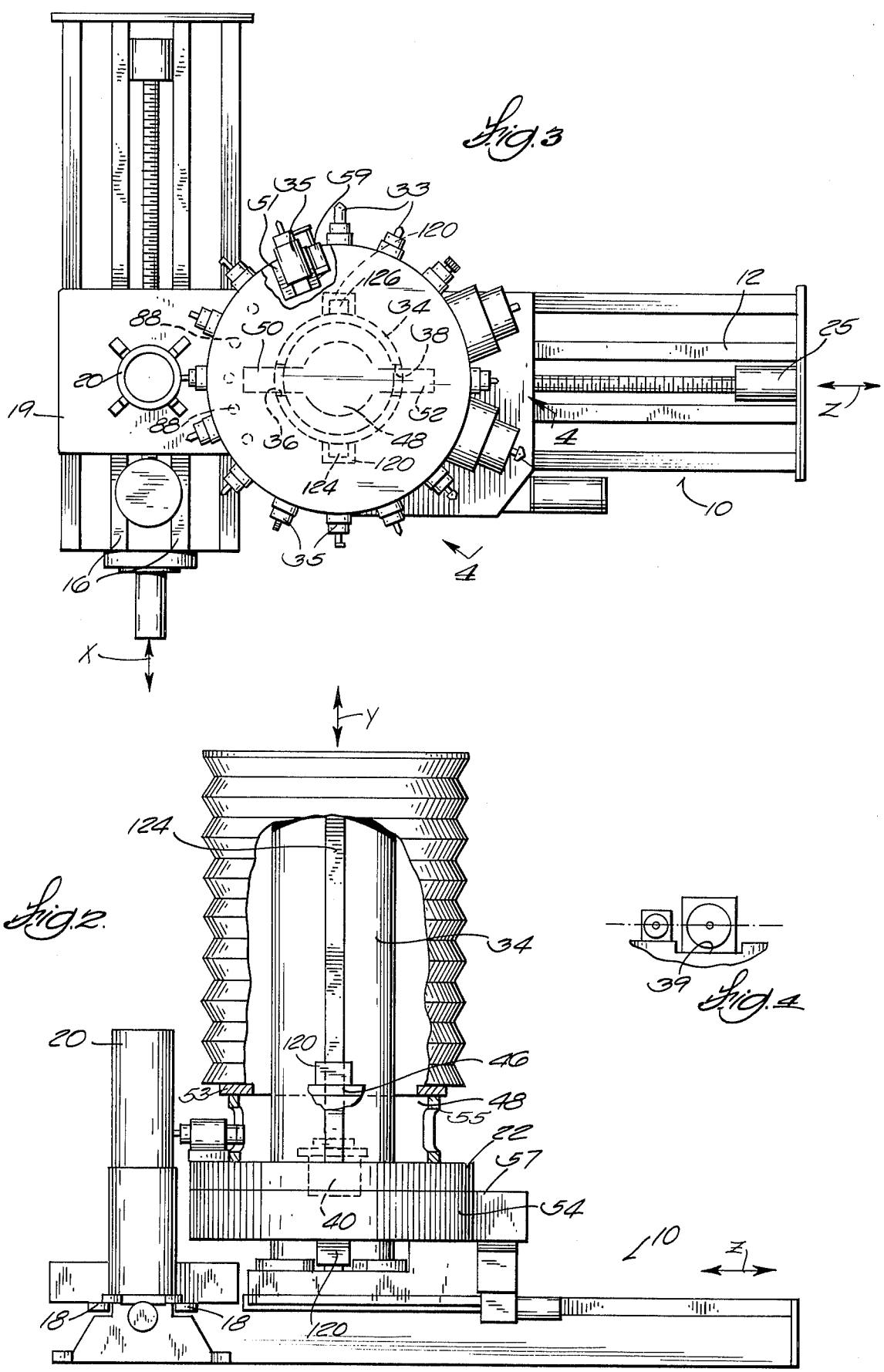

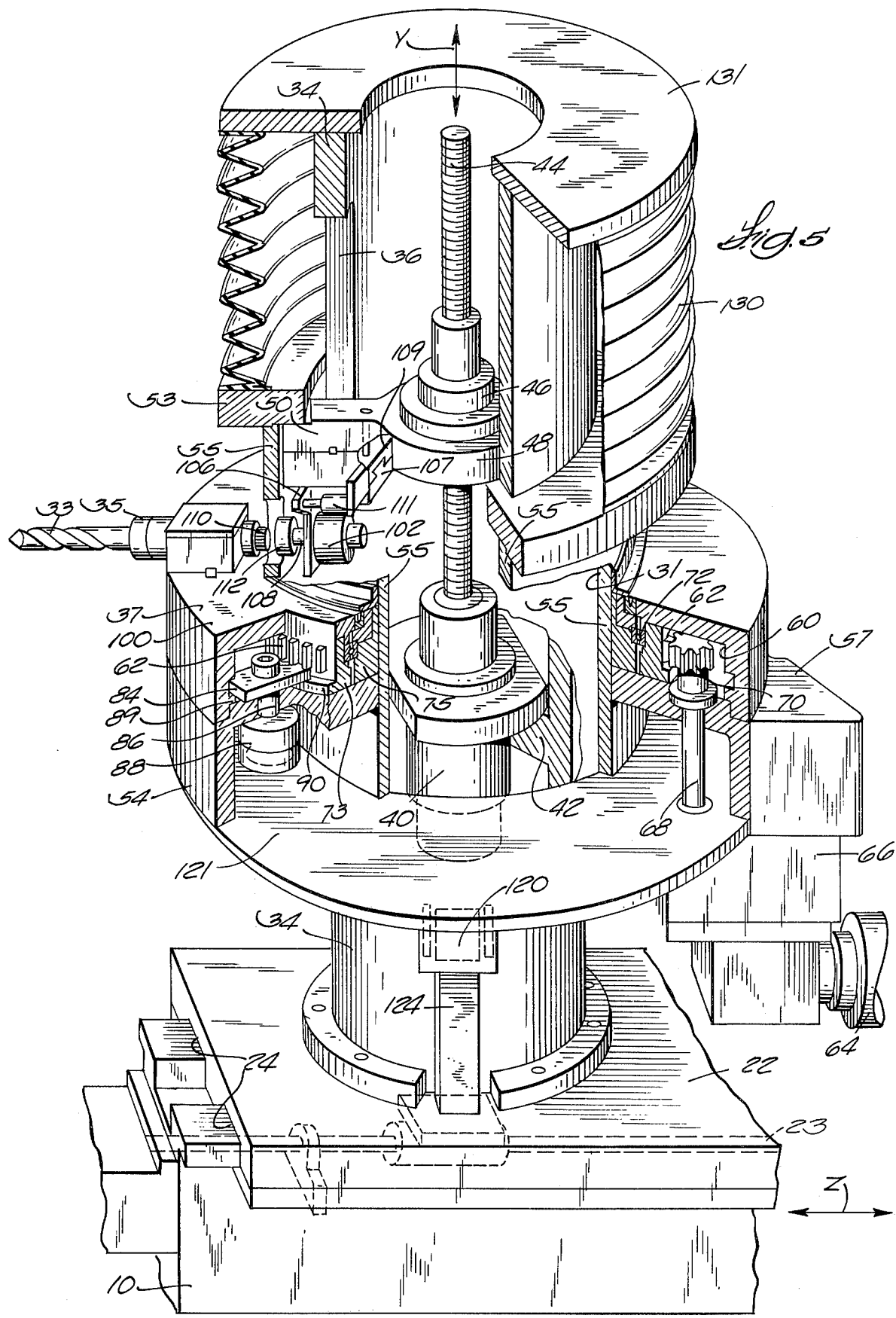

MACHINE TOOL WITH MULTIPLE TOOL TURRET

SUMMARY OF INVENTION

The machining apparatus of the invention includes a tool turret which is supported on a vertical column for vertical movement along a Y axis and rotary indexing movement about the column. The column is carried by a saddle operated by a motor driven lead screw for movement along a horizontal Z axis for tool feed into a work piece carried on a cross slide which is movable along a transverse horizontal X axis.

The turret is supported on the column by a yoke and support ring. The yoke has arms which extend through vertical slots in the column. The yoke and support ring are reciprocated vertically along the Y axis by a ball nut assembly fixed to the yoke and a motor driven screw within the column. The yoke is connected to a turret support ring which is located exteriorly of the column and concentric with the column. Vertically extending guide rails fixed to the column and bearing assemblies on the support ring confine the support ring against rotational movement and afford guided vertical movement of the support ring and turret. The tool turret is supported on an upper deck of the support ring by an annular bearing. A ring gear on the turret enables indexing movement of the turret to locate the desired spindle in the working position by a cam drive index mechanism carried by the support ring.

Some conventional machine tools employ tool changers which use a common spindle with equipment to interchange the tools. The present invention employs a turret with pre-loaded tool spindles which can be readily indexed to position the desired tool to minimize the tool change time interval required in machine tools with tool changers. Special spindles can also be employed with independant feed and drive for precision boring. Various size spindles can also be accommodated on the turret for differing tools and tool sizes. Vertical and angle spindles can also be employed. The tool spindles are rotated by a single variable speed hydraulic motor located within the column. The hydraulic motor is supported on a slide and has a coupling element which is movable through one of the vertical slots in the column to couple with the tool spindle indexed for machining use. The coupling element is retracted during indexing of the turret and advanced to drive the tool spindle when the selected tool is in the proper position. All cutting tools are pre-set in a fixed position at each tool spindle station. No changing of cutting tools takes place during a working cycle. At the end of each working assignment the spindle drive unit disengages automatically and the turret indexes the next tool spindle into the working position. The close coupling between the tool drive motor and the tool spindles in all turret positions eliminates the whip that occurs in some prior art machine tools.

Inasmuch as the normal tool feed along the Z axis is caused by translatory movement of the entire column and turret a substantial tool stroke is afforded and heavy cuts can be made. In prior art tool changers long strokes require delays while exchanging tools.

The machine is adapted for numerical control of the cutting tool along the Z and Y axes and the work material along the X axis and a vertical B axis. Thus work positioning, spindle and tool selection, speed selection and feed rate selection can all be controlled.

Further objects and advantages of the invention will be apparent from the disclosure.

DESCRIPTION OF DRAWINGS

FIG. 2 is a diagrammatic side elevational view of the apparatus shown in FIG. 1.

FIG. 3 is a plan view of the apparatus shown in FIG. 2.

FIG. 4 is a sectional view along line 4—4 of FIG. 3.

FIG. 5 is an enlarged diagrammatic fragmentary perspective view with parts broken away of the machining apparatus shown in FIG. 1.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
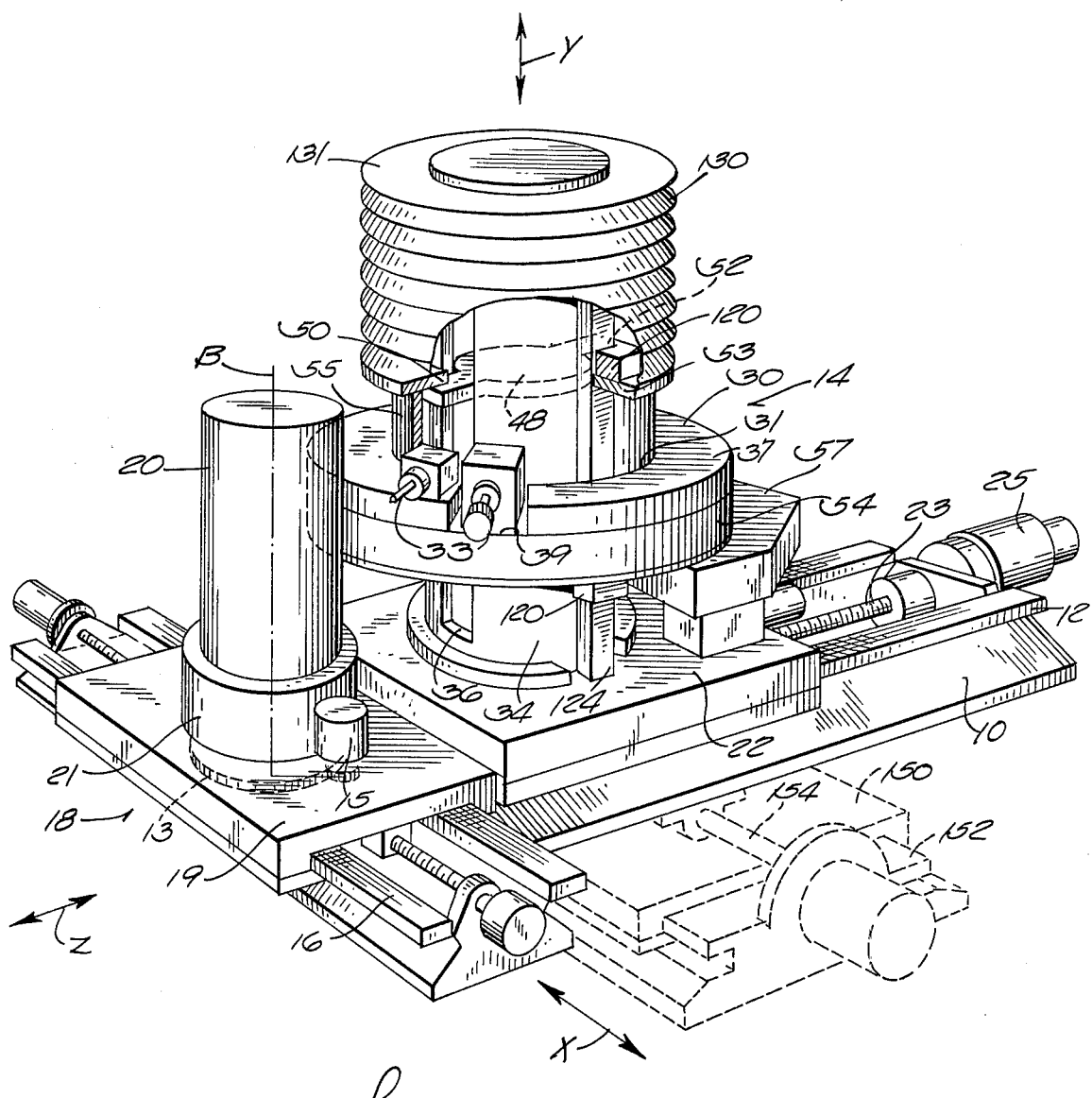
FIG. 1 is a diagrammatic perspective view of a machine tool apparatus in accordance with the invention.

The apparatus includes a machine frame or bed 10 (FIGS. 1, 2) with ways 12 parallel to the Z axis for guiding movement of the machining assembly 14 along the Z axis. Tool feed as subsequently described is in the direction of the Z axis. Ways 16 guide a work carrier 18 for movement of work 20 along an X axis at right angles with the Z axis. The work carrier 18 includes a saddle 19 and an indexing table 17 indexed by a motor and drive 15 about a vertical B axis and chuck, clamp expanding mandrel 21 or the like (FIG. 1). The work carrier 18 is provided with a ring gear 13 and indexing motor 17 to index the work about a vertical B axis. As illustrated in the drawings the work 20 is an electric motor housing.

The machining assembly 14 is supported on the ways 12 by a saddle or slide 22 which has companion ways 24 (FIG. 5) which receive the ways 12. The slide 22 is moved along the Z axis by a driven lead screw 23. The screw 25 is driven by a numerically controlled motor 25 (FIG. 3). A ball nut assembly (not shown) connected to the slide 22 threadably receives the lead screw 23.

The machining assembly 14 includes an indexable tool turret 30 (FIG. 1) which is supported as hereinafter described for rotary indexing movement about a vertical or Y axis. The turret 30 is in the form of an annulus or torus with a central opening 31. Machining tools such as drills, taps, milling cutters, etc. 33 (FIG. 3) are radially arranged with respect to the Y axis and circumferentially spaced on the turret 30. Each tool is mounted in a separate tool spindle 35 which is bolted to the deck 37 of the turret. Thrust keys can be employed to prevent tool deflection. Various types and sizes of conventional tool spindles 35 can be employed to accommodate different tools. The spindles can be geared with different gear ratios for different machining operations. The turret deck 37 can have offset surfaces such as 39 (FIG. 1) to accommodate large spindles for large diameter drills. The tool turret can carry various numbers of tool spindles depending upon the diameter of the turret. A practical size turret would accommodate up to 16 different tool spindles for various machining operations for a single work piece. A turret carrying 24 or more spindles is feasible. The larger the angular spacing between tools the more clearance is afforded between the work piece and the spindles not in use and thus the longer the tool stroke. For precision boring or other precision machining operations a tool spindle 35 can be mounted on a slide 51 with a fluid cylinder 59 to provide feed of the spindle.

Supporting and elevating means are provided for supporting the turret for rotational indexing movement about the Y axis and for raising and lowering the turret along the Y axis. In the disclosed construction the means comprises a column 34 which is connected to and is upstanding from the slide 22. The column 34 has elongated vertically extending slots 36 and 38 (FIGS. 1, 2) which are oppositely located at 180° in the column wall and which extend for a substantial length of the column 34. The slots 36, 38 are open along the Z axis to enable coupling of the spindles 35 with a hydraulic motor 102 (FIG. 5) located within the column.

The supporting and elevating means includes a motor 40 (FIGS. 5, 6) which is supported on inturned flanges 42 (FIG. 4) in the column 34. The motor is connected through a gear reduction unit 41 to a screw 44 which is received in a ball nut assembly 46. The ball nut assembly is connected to a yoke 48 which has yoke arms 50 and 52 which extend through the vertical column slots 36 and 38.

The yoke arms 50 and 52 are fixed to an upper plate 53 which is connected to a sleeve portion 55 which extends upwardly from a support ring 54. The sleeve portion 55 extends through the opening 31 in the tool turret 30. The turret 30 is carried by an annular deck 57 of the support ring 54. Thus vertical up and down movement of the yoke 48 along the Y axis caused by rotation of the screw 44 causes a corresponding upward and downward movement of the support ring 54 and the turret 30.

The tool turret 30 is provided with an annular cavity 60 (FIG. 5) with ring gear teeth 62 facing the cavity 60. Indexing movement of the turret is provided by a motor 64 through a cam mechanism 66 which drives shaft 68. A mechanism such as that shown in U.S. Pat. No. 2,986,949 can be employed. A clutch and brake are also employed with the motor. A gear 70 on shaft 68 meshes with the ring gear 62 to provide indexing movement of the turret 30. Guided rotation of the tool turret 30 about the column 34 is provided by bearing 72 (FIGS. 5, 6) located between the turret wall 73 and a flange 75 on the sleeve portion 55. The bearing 72 is an annular bearing which is concentric with the column 34 and is a 4 point contact bearing to provide radial and vertical support.

The tool turret 30 is locked when a tool spindle is in the working position along the Z axis by several locking devices (one of which is shown in FIG. 5) which include clamping plates 84 connected to piston rods 86 of fluid cylinders 88. Actuation of the fluid cylinders provides clamping pressure of the plates 84 on the flanges 89 and 90 of the turret 30 to rigidly secure the tool turret to the deck 57 of the non-rotatable support ring to prevent tool deflection during machining. The clamping pressure deflects the bearing 72 and removes the clearance between the support ring and turret.

Figure 6:
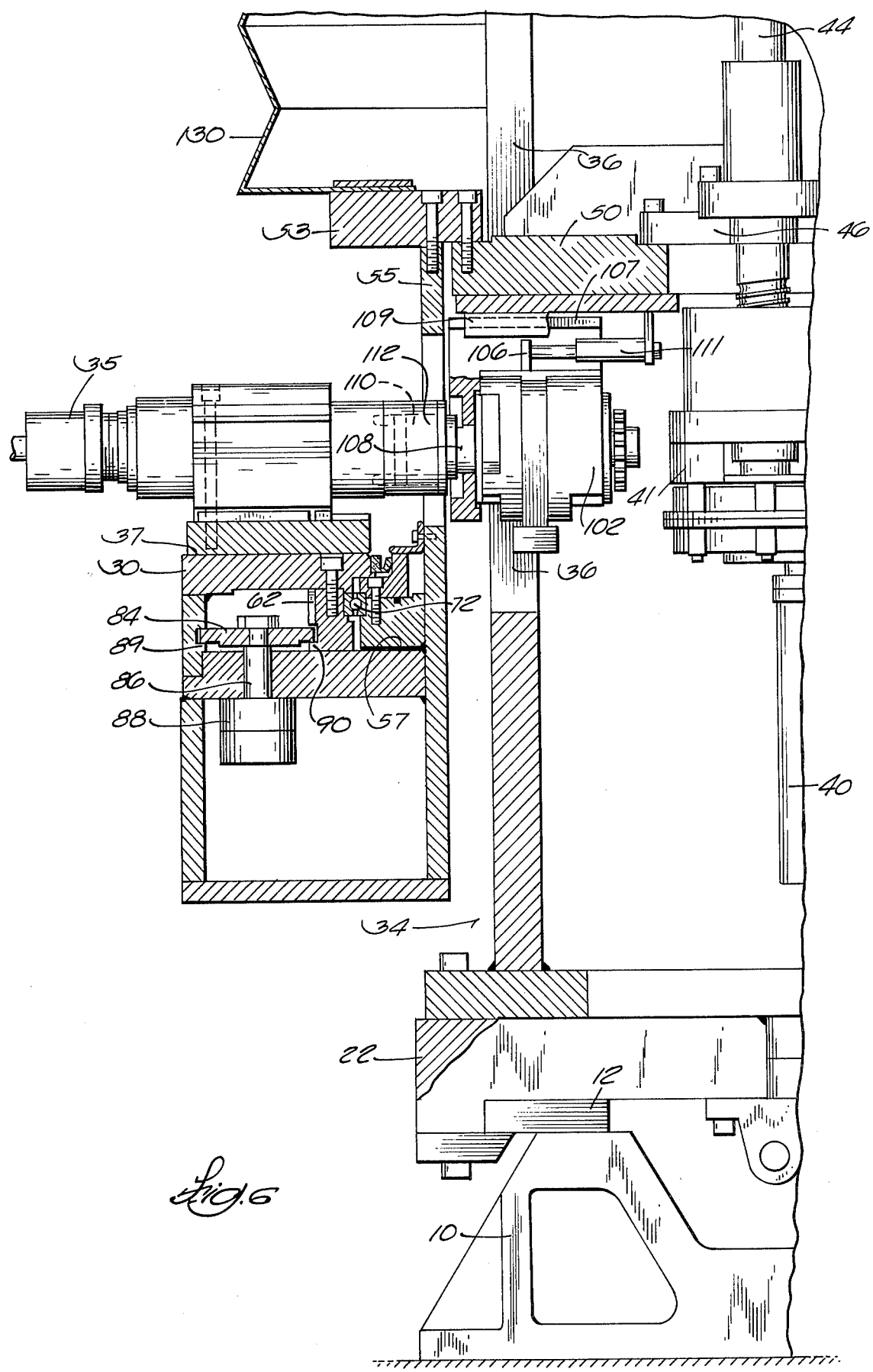
FIG. 6 is an enlarged fragmentary side elevational view in fragmentary section of the apparatus shown in FIG. 5.

A single drive means is provided for rotating the spindles 35 when the spindles are in the working position. In the disclosed construction the tool drive means includes a variable speed hydraulic drive motor 102 which is supported by a bracket 106. The bracket 106 has a slide 107 which is movable in a guide 109 connected to arm 50 of the yoke 48. The tool spindles 35 and output shaft 108 of the drive motor are provided with coupling elements 110 and 112 (FIGS. 5, 6). The bracket 106 is moved to cause coupling of the coupling elements 110, 112 by a fluid cylinder 111 connected between the bracket 106 and the guide 109. The output shaft 108 of the drive motor 102 is axially aligned on the feed axis Z and is movable only into an advanced coupling position when a tool is indexed for feed along the Z axis. The motor 102 and the coupling element 112 are automatically retracted from the column slot 36 when the turret 30 is indexed. The hydraulic circuit (not shown) for the motor 102 can include pressure sensing devices to monitor the tool torque to sense tool cutting conditions. Inasmuch as the tool spindle drive motor 102 moves vertically with the turret it is closely coupled in a constant position relative to the tool spindle working position. Accordingly, whip of drive components is eliminated.

Vertical guided movement of the turret 30 about the column 34 is afforded by 4 bearing boxes 120 each of which contain 3 sets of recirculating way bearings such as disclosed in U.S. Pat. No. 3,003,828. The bearing boxes 120 are carried by the upperplate 53 (FIG. 1) and bottom plate 121 and cooperate with two vertical extending posts or column ways 124, 126. There are two bearing boxes for each post. The posts 124, 126 as best shown in FIG. 3 are oriented 180° apart and in a plane at 90° with the direction of feed along the Z axis to carry the loading forces. The tool reaction is in a plane through the 4 bearing boxes to prevent tool chatter and prevent an over turning moment for cutting rigidty. The posts 124, 126 are keyed and fixed to the exterior surface of the column 34. The top of the column 34 can be enclosed by a bellows cover 130 which is connected to the top plate 53 and a plate 131 on the top of the column.

The machine tool of the invention is adapted for numerical control of the cutting tools along the Y and Z axes and the work along the X axis. Resolvers are employed in connection with the control circuit. A conventional linear resolver can be mounted on the column 34 to determine proper positioning of the turret along the Y axis. A rotary resolver associated with the lead screw 23 facilitates positioning of the cutting tool along the Z axis.

The column 34 can be supported on a cross slide for tool positioning along the X axis as well as the work. In FIG. 1 the bed on frame 10 is optionally carried on a saddle 150 which is supported on ways 152. A driven lead screw 154 is connected to the bed 10. The turret 30 then could shuttle between a plurality of work carriers.

The machine tool of the invention is adapted for rapidly completing a sequence of programmed machining operations. Indexing of the turret to change spindles can be accomplished in one second between successive stations. Some prior art tool changers require as long as 30 seconds to change tools. The use of a tool carrying turret rotatable in a horizontal plane with tool feed provided by a lead screw and large h.p. motor provides a long tool stroke with heavy feeding capability. The use of individual spindles which are appropriate in size and speed for the tool carried by the spindle greatly expands the versatility and efficiency of the apparatus.

The large mass of the turret and column reduces cutting vibrations. Moreover, the use of individual spindles for each tool and thus the elimination of constant tool changing prevents the introduction of dirt and chips into the spindles which can cause misalignment of the tools in machine tools with tool changers.

I claim:

1. Machining apparatus comprising a machine frame, a tool turret, a plurality of machining tools carried by said turret, means for supporting said turret to afford rotation of said turret about a Y axis, said means including a column and a sleeve surrounding said column and bearing means on said sleeve for rotatably supporting said turret, means for rotating said turret to position a selected tool along a Z axis at a right angle with respect to the Y axis, means for supporting said column on said frame for movement along said Z axis for tool feed, tool drive means for rotating said selected tool when a tool is in the working position along the Z axis, guide means for guiding movement of said sleeve along said Y axis, said guide means including ways extending along said column and fixed to said column and bearings supported on said sleeve and cooperating with said ways to guide movement of said sleeve along said column and including elevator means for raising and lowering said sleeve and said turret along said Y axis.

2. Machining apparatus comprising a machine frame, a tool turret, a plurality of machining tools carried by said turret, indexing means for supporting said turret to afford rotation of said turret about a Y axis, means for rotating said turret to position a selected tool along a Z axis at a right angle with respect to the Y axis, means for supporting said turret on said frame for movement along said Z axis for tool feed, tool drive means for rotating said selected tool when a tool is in the working position along the Z axis and including elevator means for raising and lowering said turret along said Y axis, wherein said elevator means comprises a column supported on a saddle said saddle being movable on ways parallel with said Z axis, vertically extending opposed slots in the column, a suspension yoke having arms extending through said slots, means exteriorly of said column for supporting said turret from said yoke arms and means in said column connected to said yoke for reciprocating said yoke and said turret along said Y axis and guide means on said column to guide said turret for said reciprocating movement along the Y axis.

3. Machining apparatus in accordance with claim 2 and wherein said turret has a tool deck and wherein said tool drive means comprises tool spindles supported on said deck and extending radially of said Y axis, a motor with an output shaft located within said column, means supporting said motor on said yoke for movement of said output shaft along the Z axis, coupling means on said output shaft and said tool spindles and means for advancing and retracting said output shaft along said Z axis to engage and disengage said coupling means.

4. Machining apparatus in accordance with claim 2 wherein said means for supporting said turret to afford indexing rotation about the Y axis includes a support ring having an upstanding sleeve portion concentric with said column and located exteriorily thereof, said sleeve being connected to said yoke, said support ring having a deck supporting said turret and said indexing means for rotating said turret being carried by said support ring.

5. Machining apparatus in accordance with claim 4 including guide rails fixed to the exterior of said column and extending parallel to the Y axis, and bearings on said support ring in bearing contact with said guide rails.

6. Machining apparatus in accordance with claim 5 wherein said guide rails are located in a plane at 90° with respect to the Z axis.

7. Machining apparatus comprising a machine frame, a tool turret, a plurality of machining tools carried by said turret, indexing means for supporting said turret to afford rotation of said turret about a Y axis, means for rotating said turret to position a selected tool along a Z axis at a right angle with respect to the Y axis, means for supporting said turret on said frame, tool drive means for rotating said selected tool when a tool is in the working position along the Z axis and means for engaging and disengaging said tool drive means with said selected tool, and wherein said turret has a tool deck for supporting tool spindles, said deck having recesses to receive tool spindles of different sizes with the depth of said recesses being such as to position all tools carried by said turret in a common plane through their rotational axes.

8. Machining apparatus in accordance with claim 2 wherein said means for rotating said tools comprises tool spindles on said turret, a drive motor supported on said yoke, said drive motor having an output shaft and coupling means to couple said spindles with said drive means, and means for moving said coupling means through one of said slots in said column to couple said drive means with a spindle registered with said slot.

9. Machining apparatus comprising a machine frame, a first saddle, ways on said frame for guiding said first saddle along a first horizontal axis, drive means connected to said first saddle for movement of said first saddle along said first horizontal axis, a column supported on said first saddle and extending upwardly therefrom, vertically extending slots in said column, a yoke having arms extending through said slots, a support ring arranged about said column and connected to said yoke arms, bearings on said support ring cooperating with surfaces on said column to provide guided vertical movement of said support ring on said column, a tool turret supported on said support ring, drive means carried by said support ring for rotating said tool turret to any one of a plurality of pre-selected positions, drive means within said column and connected to said yoke for raising and lowering said support ring and tool turret to a selected vertical position, a plurality of tool spindles carried by said turret, tool spindle motor means in said column and means for coupling and decoupling said motor means with said tool spindles, a cross saddle movable along a second horizontal axis transverse to said first horizontal axis, and work clamping means on said second saddle.

10. Machining apparatus in accordance with claim 9 wherein one of said vertical column slots is open along said first horizontal axis and said coupling means for said tool spindle motor means is movable through said slot to couple with said spindles.

11. Machining apparatus in accordance with claim 9 wherein said ways for supporting said first saddle are supported on a second saddle for movement of said column and turret along a horizontal axis transverse to said first horizontal axis.

12. Machining apparatus in accordance with claim 9 including means for rotating said work clamping means about a vertical axis.

13. Machining apparatus in accordance with claim 9 including slide means for supporting said tool spindles and motor means for advancing said tool spindle on said slide independant of said turret movement.

* * * * *